United States Patent Office 2,927,922
Patented Mar. 8, 1960

2,927,922

CERTAIN SUBSTITUTED IMIDAZOLIDINE GUANYLIMINES

William B. Hughes, Webster Groves, Mo., assignor to Cities Service Research and Development Company, New York, N.Y., a corporation of New Jersey No Drawing. Application December 31, 1957
Serial No. 706,274

10 Claims. (Cl. 260—240)

This invention relates to inhibiting corrosion of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas, as is generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

I have now discovered that corrosion of the type described may be substantially inhibited by introducing into the oil and gas production, collection and distribution lines, as well as associated equipment, including tanks, a small but sufficient quantity of a reaction product obtained by first reacting dicyandiamide with a polyamine in substantially equimolar quantities to provide an intermediate imidazolidine-guanylimine product which is thereafter reacted with one mol of a selected aldehyde or a selected monocarboxylic acid. The product resulting from reaction of the intermediate imidazolidine-guanylimine with an acid will be an amido-imidazolidine guanylimine. In reacting the intermediate product with the selected aldehyde, the desired amido-imidazolidine-guanylimine compound will be produced. These new compounds unexpectedly provide superior corrosion inhibiting protection when utilized in the manner hereafter described.

In preparing these new compounds the intermediate aminoethyl imidazolidine guanylimine is prepared by reacting one mol of polyethyleneamine with one mol of dicyandiamide under conditions which effect the removal of one mol of ammonia from the reaction mixture. The intermediate product resulting is thereafter reacted on an equimolar basis with the selected acid or aldehyde to produce the desired product.

These new compounds may be generally characterized as dark in color, syrupy in consistency and soluble in oil.

The new compounds of this invention can be characterized by the following general formula:

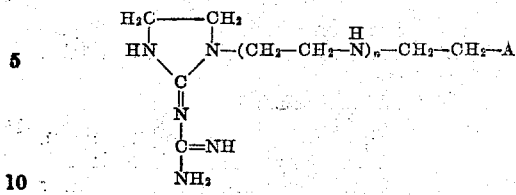

wherein $n$ is a number from zero to 2 and A is selected from the group consisting of

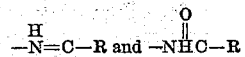

in which R is a monovalent hydrocarbon radical having from 2 to 18 carbon atoms.

In preparing products of the foregoing structure, it will be necessary to utilize an amine having at least 2 alkylene groups such as is found in diethylenetriamine. Other higher molecular weight polyamines such as triethylenetetramine and tetraethylene pentamine may be used. Other polyalkylene amines may be used if available.

In preparing the amido-imidazolidine guanylimine compounds, a selected monocarboxylic acid having from 2 to about 18 carbon atoms may be used. Depending on the particular acids selected, R representing the acid residue, may be alkyl, hydroxy alkyl, aryl, alkaryl, arylalkyl, or acyl group. Among the acids which may be used in preparing the new compounds of my invention are the following: acetic, propianic, butyric, valeric, caproic, caprylic, undecenoic, lauric, myristic, palmitic, stearic and ricinoleic. If it is desired to produce an imine imidazolidine guanylimine compound, the intermediate amino alkyl imidazolidine guanylimine is reacted as previously indicated with an equimolar amount of a selected aldehyde having from 2 to 18 carbon atoms. Among the aldehydes which are suitable for this purpose are: formaldehyde, acetaldehyde, propanal, butyraldehyde, valeraldehyde, caproaldehyde, caprylaldehyde, nonaldehyde, palmaticaldehyde, acrolein, crotonaldehyde, benzaldehyde, tolualdehyde, salicylaldehyde and heptaldehyde.

In order to more fully understand the nature of the compounds of my invention, the manner in which they are prepared, and the method by which they may be utilized in protecting metallic surfaces from corrosive action, the following specific examples are provided:

EXAMPLE 1

To 84 grams (1 mol) of dicyandiamide, 103 grams of diethylenetriamine is added. To this mixture one mol of 5% hydrochloric acid is added. The mixture is then heated with stirring to evaporate water, with heating thereafter continued for a period of about four hours at a temperature of between 140° C. and 150° C. or until no further ammonia evolution is detected. The product resulting is neutralized with dilute sulphuric acid. The resulting white crystals are recrystallized from cold water and dried. This dried material is then decomposed by treatment with 10% sodium bicarbonate solution. Water present in the solution is then evaporated at atmospheric pressure until excessive foaming occurs. Benzene is then added to the solution and the remaining water removed by azeotropic distillation. The resulting substantially colorless syrup remaining after benzene removal has a molecular weight of 170. This product is the intermediate compound.

To 17 grams of the intermediate product 28.5 grams of stearic acid is added together with approximately 50 ml. of xylene. Heat is applied to the reaction mixture for approximately four hours until the theoretical amount of water is recovered. This recovery is accomplished by trapping the xylene azeotrope.

The final product was a semi-solid viscous material soluble in oil.

When tested as a corrosion inhibitor, this product provided the protection indicated for inhibitor No. 2 in Table I which follows.

EXAMPLE 2

Following the procedure set forth in Example 1 above, 17 grams of the intermediate product of Example 1 is reacted with 12 grams of benzoic acid under conditions substantially the same as those set forth above.

The product of this reaction provided the protection as shown for inhibitor No. 3 in Table I.

EXAMPLE 3

Following the procedure of Example 1 above, 28 grams of oleic acid is reacted with 17 grams of the intermediate product of Example 1 to provide the product identified as inhibitor No. 1 in Table I.

As previously pointed out, if the intermediate imidazolidine guanylimine is prepared with an amine other than the polyamines mentioned, the resulting final product will incorporate the structure of the particular amine used.

In Table I it will be noted that the inhibitors identified as 6–10 were prepared with ODT. This compound is a commercial product available from the Monsanto Chemical Company and is a C12 substituted diethylene triamine having a molecular weight of 273. The amido-imidazolidine guanylimine compounds prepared with this amine provided protection indicated in Table 1.

If the intermediate imidazolidine guanylimine compound is reacted with the selected aldehyde as previously described, an imido imidazolidine guanylimine results.

EXAMPLE 4

To 17 grams of the intermediate products of Example 1, 11.4 grams of heptaldehyde is added. Spontaneous reaction occurs with water separating out as a layer. The dark, oil soluble imido imidazolidine guanylimine product is cooled and dried by azeotropic distillation with benzene. The resulting black oil product may be used as a corrosion inhibitor without further purification.

This product is identified as inhibitor No. 2 in Table II which follows.

EXAMPLE 5

Following the procedure set forth in Examples 1 and 4 above, 10.6 grams of benzaldehyde is reacted with 17 grams of the intermediate product of Example 1. Recovery of the final product is accomplished as described in Example 4. The corrosion inhibiting test results for this product are found in Table II in the inhibitor identified as No. 3.

The effectiveness of these new compounds in reducing corrosion in gas and oil well production, collection, distribution and storage equipment, as well as other metal surfaces exposed to corrosive fluids, may be more fully understood by reference to certain corrosion tests which I have conducted using an acidic brine solution to substantially duplicate well or pipe line conditions. The specific test procedure utilized herein is designed to simulate conditions existing in a gas condensate well. The test technique makes use of an apparatus which deposits a test panel alternately through two phases at the rate of three times per minute. The corrosive mixture or medium is held in a one-liter, three-necked, round bottom flask equipped with a heater, a mercury sealed stirrer, a reflux condenser, and an inlet for passing gas into the bottom of the corrosive liquid. In the test, the stirrer is replaced by a glass hook arranged to carry the test piece. The dipping apparatus is powered by a small electric motor through a cam connection.

The corrosive medium employed was a 5% sodium chloride solution to which has been added 0.2 ml. of a mixture of 50 weight percent formic acid and 50 weight percent acetic acid. To this acid mixture, a varying amount of kerosene is added (10 to 400 ml.) and carbon dioxide or natural gas allowed to pass through the mixture during the test. The variation of kerosene volume permits the test to more nearly simulate conditions existing either in a condensate well or a gas pipe line.

In running the test, the corrosive medium is heated to boiling and the gas introduced. A punched, cleaned, weighed test panel, made of 18 gauge, cold rolled steel, measuring 7/8" x 1", was suspended on the glass hook and the dipping process started. The test is normally run for 90 minutes. At the end of this time, the test panel is removed, cleaned, dried, and weighed to give a blank loss. The inhibitor is then introduced to the corrosive medium, the test panel replaced, and the test again continued for an additional 90 minutes. At the end of this time, the panel is again cleaned and weighed to give an inhibited test loss.

The changes in weight of the test strips during the test were taken as a measurement of the effectiveness of the inhibitor composition. By this means, a percentage protection may be calculated for each inhibitor in accordance with the following formula:

$$\frac{L1 - L2}{L1} \times 100 = \text{percent protection}$$

in which $L1$ is the loss in weight of the strips taken from the uninhibited test, and $L2$ is the loss in weight of the strips taken from the inhibited test.

The tables which follow show the average percent protection obtained from tests conducted on the new compounds of my invention in the amounts recorded.

Table I

| Inhibitor Number | Composition | Percent Protection | |
|---|---|---|---|
| | | 50 p.p.m. | 100 p.p.m. |
| 1 | Deta, Dicy, Oleic 1:1:1 | 67.9 | 89.1 |
| 2 | Deta, Dicy, Stearic 1:1:1 | 71.0 | 88.9 |
| 3 | Deta, Dicy, Benzoic 1:1:1 | 74.6 | 90.2 |
| 4 | Deta, Dicy, Ricinoleic 1:1:1 | 83.8 | 94.0 |
| 5 | Deta, Dicy, Acetic 1:1:1 | 44.2 | 51.6 |
| 6 | Amine ODT Dicy. Acetic 1:1:1 | 71.8 | 92.3 |
| 7 | Amine ODT Dicy. Butyric 1:1:1 | 80.0 | 89.1 |
| 8 | Amine ODT Dicy. Benzoic 1:1:1 | 62.1 | 87.8 |
| 9 | Amine ODT Dicy. Oleic 1:1:1 | 89.7 | 96.1 |
| 10 | Amine ODT Dicy. Ricinoleic 1:1:1 | 89.1 | 98.8 |

Table II

| Inhibitor Number | Composition | Percent Protection | |
|---|---|---|---|
| | | 50 p.p.m. | 100 p.p.m. |
| 1 | Deta, Dicy, Butyraldehyde | 73.8 | 90.2 |
| 2 | Deta, Dicy, Heptaldehyde | 82.8 | 97.0 |
| 3 | Deta, Dicy, Benzaldehyde | 60.4 | 81.0 |
| 4 | Deta, Dicy, HCHO | 60.9 | 83.2 |
| 5 | Amine ODT Dicy HCHO | 83.8 | 82.9 |
| 6 | Amine ODT Dicy Heptaldehyde | 90.6 | 97.8 |
| 7 | Amine ODT Dicy Butyraldehyde | 83.0 | 97.8 |
| 8 | Amine ODT Dicy Benzaldehyde | 57.3 | 81.6 |

It will be evident from the foregoing tables that the new compounds of my invention provide a substantial amount of protection against the corrosive fluids normally passing through well tubes and associated gathering equipment.

While the tests were conducted with amounts of inhibitor varying from 50 and 100 p.p.m., more or less inhibitor may be used in field operations, depending on the corrosivity of the fluid present. In field use, the concentration of the inhibitor will vary in accordance with the particular conditions found. As has been experienced over periods of time, the corrosivity of a particular well may vary widely, thus necessitating changes in the amount of inhibitor added. The inhibitors of the present invention will normally be used in amounts of from 10 to 1500 p.p.m., and generally not more than about 1000 p.p.m. Their use, of course, at the present time is somewhat limited by their cost. It would be desirable to use substantial quantities of inhibitor in view of the high losses due to corrosion, but the comparatively high cost of compounds of this type limits the amount which can be economically added for protection purposes.

In utilizing these new compounds, it has been found that excellent results are obtained by dissolving them in an appropriate amount of water or other inert solvent such as kerosine or the like. The use of such a solvent permits easy handling and is a convenient means for injecting inhibitor into the well or transfer lines. When utilized in pipe lines, the gas or oil flowing through the lines is effective to mix the inhibitor with the corrosive fluid present, sweeping the same through the system and thereby providing protection for the metal equipment with which it comes in contact after the point of injection.

It is to be understood that the improved compositions of my invention are not limited to use alone, and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. As a new composition of matter the compound having the formula

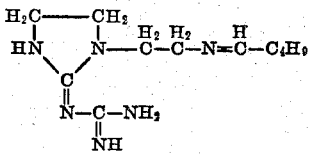

2. As a new composition of matter the compound having the formula

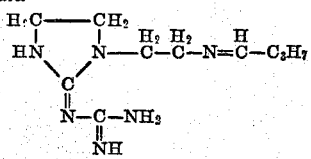

3. As a new composition of matter the compound having the formula

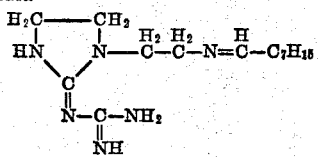

4. As a new composition of matter the compound having the formula

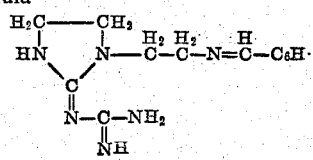

5. As a new composition of matter a compound having the formula

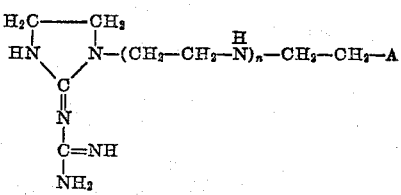

wherein $n$ is a number from 0 to 2 and A is a member selected from the group consisting of

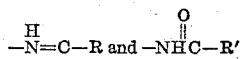

in which R is a member of the group consisting of alkyl and alkenyl radicals having from 1 to 17 carbon atoms, phenyl, tolyl and the radical of salicyl aldehyde and R' is a member of the group consisting of alkyl and alkenyl radicals having from 1 to 17 carbon atoms, phenyl and the non-carboxylic radical of ricinoleic acid.

6. As a new composition of matter a compound having the formula

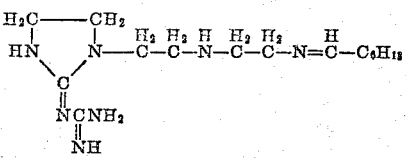

7. As a new composition of matter a compound having the formula

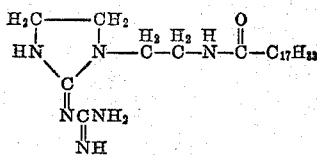

8. As a new composition of matter a compound having the formula

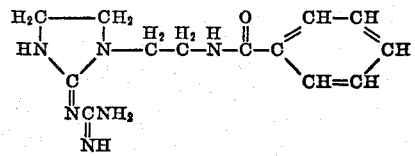

9. As a new composition of matter a compound having the formula

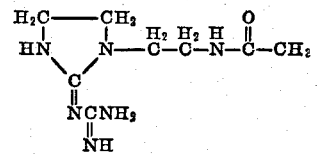

10. As a new composition of matter a compound having the formula

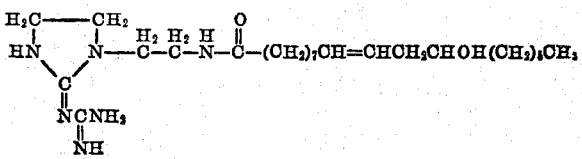

References Cited in the file of this patent
UNITED STATES PATENTS

| | | |
|---|---|---|
| 2,483,969 | Gajewski | Oct. 4, 1949 |
| 2,622,075 | Hemmi et al. | Dec. 16, 1952 |
| 2,643,978 | Hughes | June 30, 1953 |

FOREIGN PATENTS

| | | |
|---|---|---|
| 253,709 | Switzerland | Nov. 16, 1948 |